United States Patent [19]

Bolcek et al.

[11] Patent Number: 5,636,451
[45] Date of Patent: Jun. 10, 1997

[54] PROCESS FOR FEEDING SLUDGE INTO A REACTOR FOR THERMAL DISPOSAL

[75] Inventors: Rainer Bolcek; Jürgen Görz; Hans Hille; Peter Göhler; Manfred Schingnitz, all of Freidberg; Thilo Ziessler, Niedermülsen, all of Germany

[73] Assignee: Noell-DBI-Energie und Entsorgungstechnik GmbH, Freiburg, Germany

[21] Appl. No.: 333,591

[22] Filed: Nov. 2, 1994

Related U.S. Application Data

[63] Continuation of Ser. No. 102,404, Aug. 5, 1993, abandoned.

[30] Foreign Application Priority Data

Aug. 11, 1992 [DE] Germany ............... 42 26 487.1

[51] Int. Cl.$^6$ .................... F26B 3/00; B01D 1/16
[52] U.S. Cl. .............. 34/372; 48/DIG. 7; 159/48.1; 203/2
[58] Field of Search ............. 159/48.1, 48.2, 159/47.1; 203/12, 90, 2; 202/236; 34/372; 48/DIG. 7

[56] References Cited

U.S. PATENT DOCUMENTS

| | | | |
|---|---|---|---|
| 1,719,130 | 7/1929 | Richter et al. | 159/47.3 |
| 2,891,843 | 6/1959 | Moxress | 159/4.02 |
| 4,057,396 | 11/1977 | Matovich | 202/99 |
| 4,441,437 | 4/1984 | Moskau | 203/22 |
| 4,708,775 | 11/1987 | McGregor et al. | 159/47.3 |
| 5,112,441 | 5/1992 | Ruohola et al. | 159/47.3 |

FOREIGN PATENT DOCUMENTS

| | | | |
|---|---|---|---|
| 1200055 | 2/1986 | Canada | 159/47.3 |
| 3928815 | 6/1990 | Germany . | |
| 1127001 | 5/1989 | Japan | 159/48.1 |
| 1375919 | 2/1988 | U.S.S.R. | 159/48.1 |
| 1210105 | 10/1970 | United Kingdom | 283/88 |
| 1265005 | 3/1972 | United Kingdom | 159/48.1 |

OTHER PUBLICATIONS

Industrial & Engg. Chemistry, Dec. 1938, pp. 1372–1384, Fogler et al "Spray Drying".

*Primary Examiner*—Virginia Manoharan
*Attorney, Agent, or Firm*—Cohen, Pontani, Lieberman, Pavane

[57] ABSTRACT

A process and apparatus for feeding dewatered sludge into a reactor for thermal disposal, in which process and apparatus dewatered sludge with a water content of less than 85% is subjected to a temperature-pressure treatment after exiting from a thick-matter pump and prior to its atomization within a disposal reactor. In the temperature-pressure treatment the temperature is adjusted to more than 150° C. and the pressure is adjusted to be equal to or greater than the water vapor/saturation pressure at these temperatures.

5 Claims, 2 Drawing Sheets

PROCESS FOR FEEDING SLUDGE INTO A REACTOR FOR THERMAL DISPOSAL

This is a continuation of application Ser. No. 08/102,404, filed Aug. 5, 1993, abandoned.

FIELD OF THE INVENTION

The invention relates to a process and associated apparatus for feeding sludge from residential or industrial sewage facilities into a reactor for thermal disposal.

BACKGROUND OF THE INVENTION

Disposal of sludge from residential or industrial sewage facilities is often accomplished by burning or gasification.

For this purpose the sludge is thermally dried, ground or crushed if necessary, and fed into the disposal reactor (combustion furnace, gasification reactor) as dried dust.

It is also possible to feed the sludge to the disposal reactor as an aqueous suspension by means of a pump. In this case, the suspension is finely dispersed within the disposal reactor by means of known nozzle constructions and is then burned or gasified.

It appears that much sludge, particularly sludge from sewage facilities with microbiological purification stages, takes on the consistency of a thick mush or pulp even at a relatively low solids content of 15% or less and can no longer be pumped with conventional pumps and also evades sufficient atomization within the disposal reactor. As a result of feeding sludge with a correspondingly low concentration of solids, the disposal process is burdened with large quantities of water which must at least be evaporated within the disposal reactor. This causes additional energy costs and hampers economic efficiency. However, a preliminary thermal drying of the sludge also involves heavy costs.

Thick-matter pumps have been introduced which can pump pasty and plastic materials. Such thick-matter pumps are also used to convey sludge from which water has been removed mechanically, e.g. by means of centrifuges or filter presses, until reaching a dry-matter content of 30 to 35%, the sludge being in a more or less plastic form as a filter cake. In this type of conveying, which as a rule involves high pressure losses per meter length of pipe, the material leaves the conveying pipeline as a closed, cohesive string. For this reason, atomization within a disposal reactor can be achieved by conventional means only at a high cost if at all, so that the advantage of a drastic reduction in the loading of the disposal reactor with water cannot be exploited.

SUMMARY OF THE INVENTION

Accordingly, it is an object of the present invention to provide a process and an associated apparatus which make it possible to feed mechanically dewatered sludge with a dry-matter content of 30 to 35% by means of conventional devices.

Pursuant to this object, and others which will become apparent hereafter, one aspect of the present invention resides in a process in which the sludge is subjected to a temperature-pressure treatment prior to entering a reactor for thermal disposal.

The proposed process makes it possible for sludge which has been mechanically dewatered to a dry-matter content of 30 to 35% and takes the form of a highly pasty, plastic substance to be sprayed into a reactor for thermal disposal via a pipeline by means of a thick-matter pump. This is possible because the sludge is subjected to the temperature-pressure treatment after exiting from the thick-matter pump and prior to atomization in the disposal reactor. In the temperature-pressure treatment the temperature is adjusted to more than 150° C. and the pressure is adjusted to be equal to or greater than the water vapor/saturation pressure at these temperatures.

Due to the transition from the gasification of sludge with e.g. 12% dry matter to the gasification of sludge with 35% dry matter, the gasification reactor can be relieved of 5.5 t water with reference to 1 ton dry matter. A ratio of water to dry matter of 1.86 t/t then remains. Accordingly, the precondition for economical operation and relief from thermal drying of sludge is achieved for the first time.

It has proven advantageous to carry out the pressure treatment at a temperature in the range of 200° to 250° C.

The gel-like composition of the sludge and its swelling capacity are largely or totally destroyed by means of this temperature-pressure treatment of the water-containing sludge. The solid particles which before were swelled up with water now shrink due to outlet of water, and the shrinkage is largely irreversible. This process results in a substantial change in the consistency of the sludge.

The solid particles which have shrunk in volume are carded by a greater water volume so that the viscosity of the solids-water mixture is considerably reduced. Upon entering the disposal reactor, a faultless atomization is now achieved (e.g. by means of a conventional two-substance nozzle) and a higher rate of conversion is ensured with combustion or gasification.

For a disposal process operating under pressure, e.g. a flue-flow gasification process operating under higher pressure, the pressure which is required for the pressure-temperature treatment and which should be equal to or greater than the water/saturation vapor pressure at the selected treatment temperature is determined by the given operating pressure in the reactor. However, this pressure can also be built up between the location of the temperature-pressure treatment and the reactor by designing the spray nozzle and conveying pipeline in a corresponding manner.

As is known e.g. from DE 3928815 A1, gaseous decomposition products are also released from the organic component of the sludge during the temperature-pressure treatment. This is predominantly $CO_2$.

As a rule, these gaseous and vaporous components remain in the conveying flow to the reactor and act as an additional atomization medium in the spray nozzle.

However, it is possible to separate gases and vapors. Although it is possible in principle to condense these vapors with the aim of obtaining exploitable products, the vapors and decomposition gases are, in this case, also fed to the disposal reactor via a separate line for economical reasons.

The apparatus for carrying out the process is particularly simple in that it makes use of the conveying pipeline itself to carry out the temperature-pressure treatment by externally heating a sufficient portion of the conveying pipeline.

In so doing, it is unimportant whether the heating is effected by steam, by a liquid heat-transfer medium, or by hot gases. It is also possible to heat with waste heat from the disposal process. For this purpose the heated portion of the conveying pipeline can be accommodated in the disposal reactor or in an apparatus having a sufficient temperature level which is connected downstream.

In another embodiment of the inventive apparatus, the temperature-pressure treatment is effected in a separate pressure vessel which is incorporated into the conveying pipeline and simultaneously serves as an air vessel for smoothing out the delivery pulsations caused by the pump.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
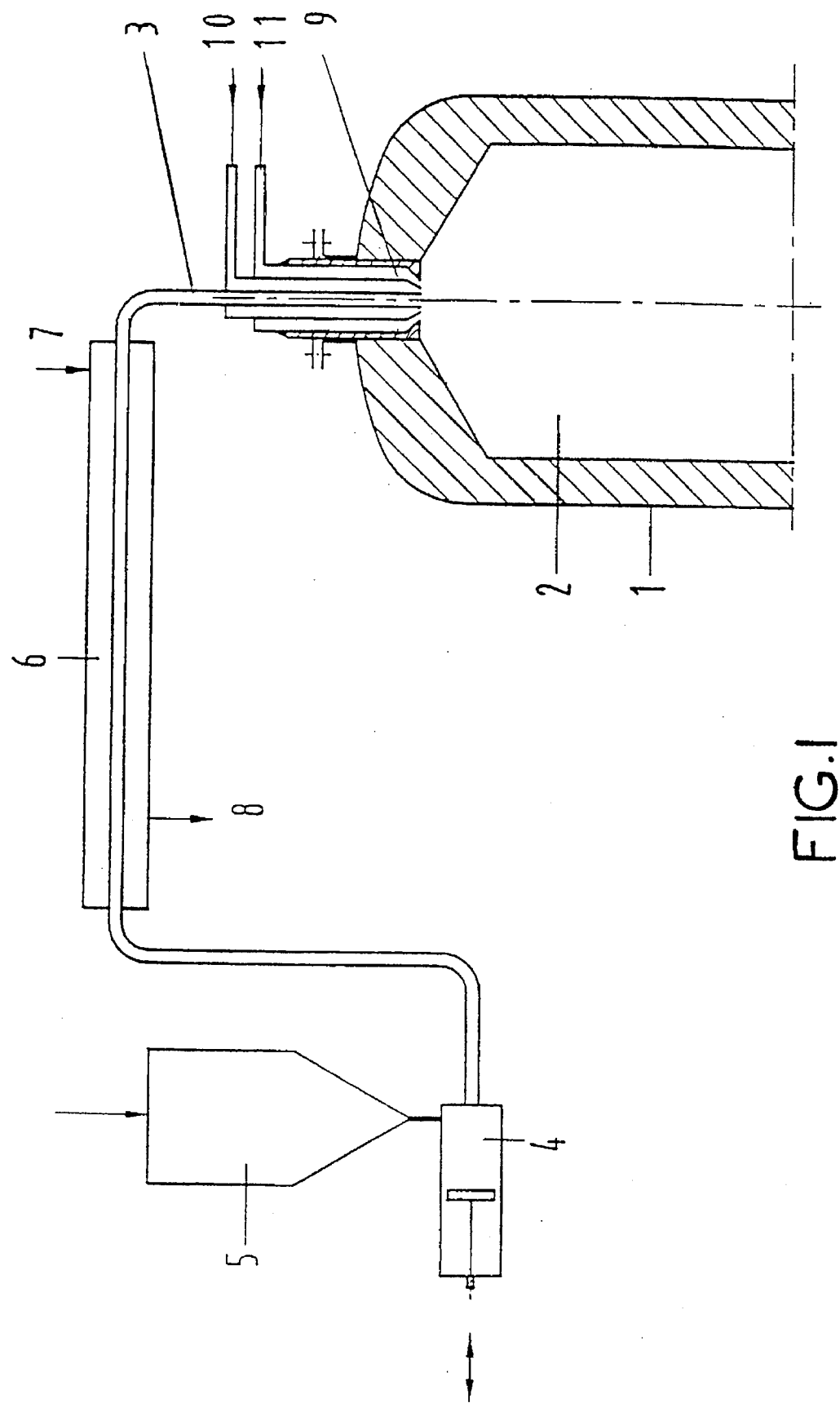
FIG. 1 shows a gasification reactor with an apparatus for feeding dewatered sludge which is heated by natural gas.

The disposal reactor 1 in FIG. 1 is a gasification reactor which works on the principle of flue-flow gasification. In its reaction chamber 2, which is under a pressure of 23 bar, the combustible portions of the supplied sludge are converted by industrial oxygen to form a burnable gas containing CO and $H_2$, while the mineral constituents are reduced to a meltable slag. Natural gas is used as a supplemental fuel.

The sludge, in the form of a plastic filter cake which is to be gasified, is dewatered mechanically by approximately 5% to a water content of less than 85%, preferably to a dry-matter content of approximately 30 to 35%. It is then delivered and pressed by a silo 5 and a thick-matter pump 4 into the disposal reactor 1 via a conveying pipeline 3. A section 6 of the conveying pipeline is heated by condensed steam at 35 bar. The steam is fed via line 7 and the condensate is discharged via line 8.

The water-containing sludge is heated to approximately 220° C. when passing through the section 6. The heated pipe length amounts to 25 m and the conveying gas speed is 1 m/s. There is a prevailing pressure of approximately 28 bar at the end of the heated section 6, whereas the saturation vapor pressure associated with 220° C. amounts to 24 bar.

The gel-like character of the sludge is destroyed by the temperature-pressure treatment and the viscosity of the sludge-water mixture is distinctly reduced as a result of the shrinkage of the solids and the delivery of water from the solid particles. This is evidenced no less significantly in that the specific pressure loss per meter of conveying pipeline is approximately 0.5 bar/m at the same diameter prior to the heated section 6 and less than 0.1 bar/m on the pipeline section leading to the disposal reactor.

The temperature-treated mixture enters the reaction chamber 2 via the mouth of a burner 9 accompanied by extensive atomization and dispersion, the mouth being constructed as a multiple-substance nozzle. The conversion with industrial oxygen which is fed to the burner via line 11 takes place in the reaction chamber 2 in the form of a flame reaction.

The pressure at the end of the heated section 6 is built up by the pressure of 23 bar prevailing in the reaction chamber 2, by a pressure drop of 3.0 bar at the mouth of the burner 9 constructed as a spray nozzle, and from the pressure loss of approximately 2.0 bar in the conveying pipeline between the heated section 6 and the burner 9.

Natural gas serves as a supplemental combustible and as an atomizing medium simultaneously and is introduced via connection 10.

Figure 2:
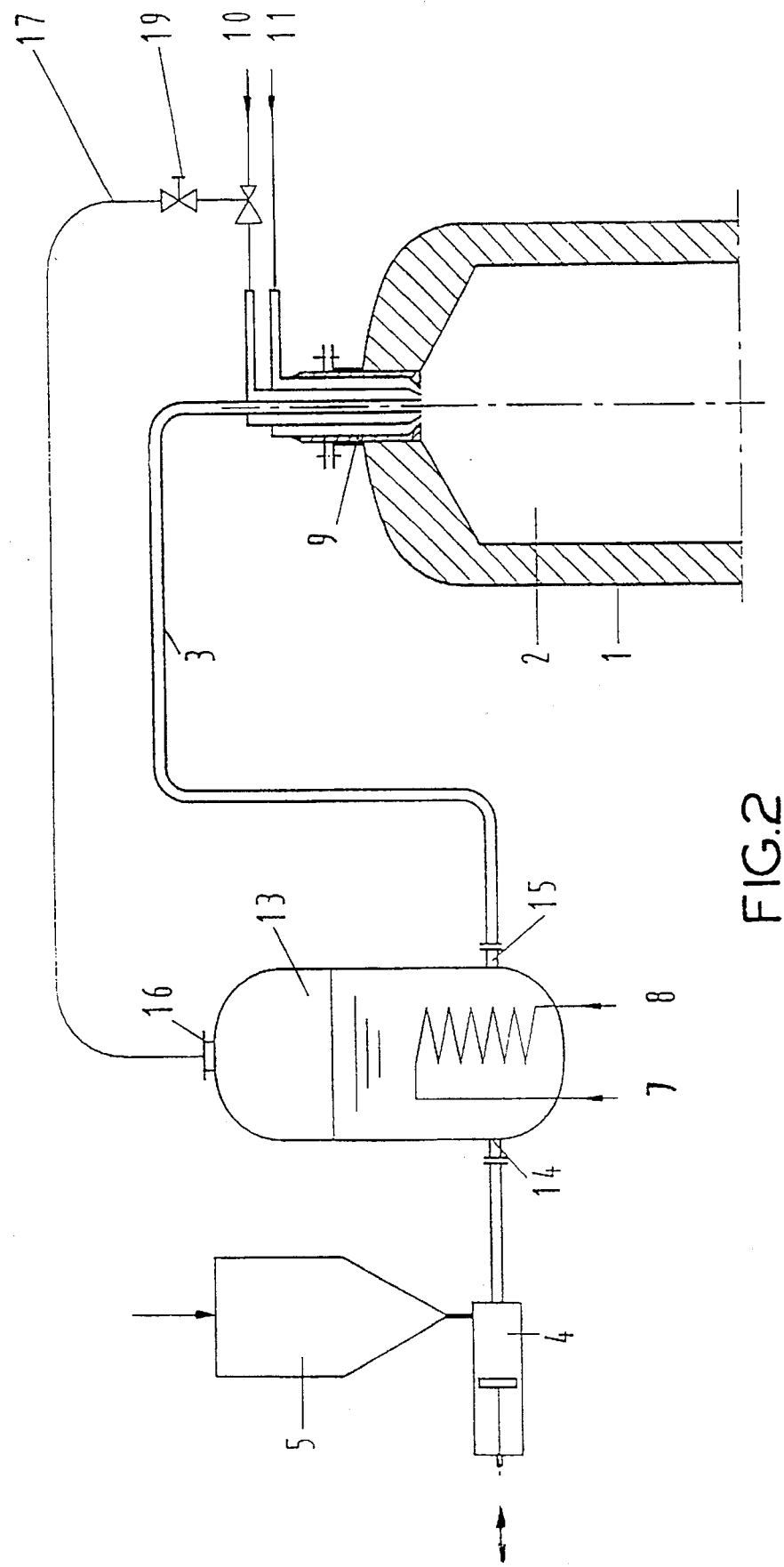
FIG. 2 shows a gasification reactor with an apparatus for feeding dewatered sludge in which the heating is effected with condensed steam.

In the embodiment shown in FIG. 2, the heated section 6 of the conveying pipeline is replaced by a heated pressure vessel 13 with an inlet 14 and an outlet 15. Here, also, the heating is effected with condensed steam at 35 bar which is supplied and carried off respectively via lines 7 and 8. The water-containing sludge is heated to 220° C. as in the first embodiment. The reactions occurring in the vessel lead to the formation of decomposition gases, predominantly $CO_2$, which collect at the head of the pressure vessel and form a pressure cushion which creates a smoother flow in the conveying pipe 3 (between the pressure vessel and burner 9) and intercepts pulsations of the pump. The decomposition gas is removed at the head of the pressure vessel at a second outlet 16 and is fed to the burner 9 via the separate line 17 which in this instance is connected to the natural gas line 10. An injector 18 for mixing is also provided. The pressure is maintained in the gas space of the pressure vessel 13 via the choke valve 19 which is controlled via a liquid measurement device in the pressure vessel 13, although this is not shown in the drawing.

The invention is not limited by the embodiments described above which are presented as examples only but can be modified in various ways within the scope of protection defined by the appended patent claims.

We claim:

1. A process for feeding sludge which is mechanically dewatered to a water content of less than 85% to a reactor for thermal disposal, consisting essentially of the steps of:

arranging the reactor with a spray nozzle in the reactor;

pumping the dewatered sludge with a thick-matter pump through a pipeline connecting the pump with the spray nozzle;

subjecting the pumped sludge to a temperature-pressure treatment before reaching the spray nozzle, in which temperature is more than 150° C. and pressure is greater than a water vapor/saturation pressure at the temperature, said subjecting step including at least partially building up the pressure required for the temperature-pressure treatment by a pressure drop in the spray nozzle, a pressure drop in a portion of the pipeline downstream of the temperature-pressure treatment and prior to the reactor, and pressure prevailing in the reactor; and subsequently atomizing the sludge in the reactor with the spray nozzle, wherein the dewatered sludge has a dry-matter content of 30 to 35%.

2. A process according to claim 1, wherein said step of subjecting the sludge to a temperature-pressure treatment is effected at a temperature in a range of 200° to 250° C.

3. A process according to claim 1, and further comprising the step of separating gaseous and vaporous products occurring during the temperature-pressure treatment from a water-solids mixture formed during the treatment.

4. A process according to claim 3, wherein said separating step includes feeding the gaseous and vaporous products which are separated off to the reactor via a separate line.

5. A process according to claim 1, wherein the subjecting step includes partially building up the pressure by a pressure of 23 bar prevailing in the reactor, a pressure drop of 3.0 bar at the spray nozzle, and a pressure drop of approximately 2.0 bar in the pipeline between the temperature-pressure treatment and the reactor.

* * * * *